(12) United States Patent
Stricker

(10) Patent No.: US 6,189,824 B1
(45) Date of Patent: Feb. 20, 2001

(54) PREVENTING TAPE SLACK IN MAGNETIC TAPE DRIVE

(75) Inventor: Scott A. Stricker, Lafayette, CO (US)

(73) Assignee: Exabyte Corporation, Boulder, CO (US)

(*) Notice: Under 35 U.S.C. 154(b), the term of this patent shall be extended for 0 days.

(21) Appl. No.: 09/289,625

(22) Filed: Apr. 12, 1999

Related U.S. Application Data

(62) Division of application No. 08/824,118, filed on Mar. 26, 1997, now abandoned.

(51) Int. Cl.$^7$ .................. G11B 15/32; G11B 5/008
(52) U.S. Cl. .................................. 242/357; 360/95
(58) Field of Search .......................... 242/357, 338; 360/85, 95

(56) References Cited

U.S. PATENT DOCUMENTS

| | | |
|---|---|---|
| 3,883,893 | 5/1975 | Ueki et al. . |
| 4,214,283 | 7/1980 | Fushimi et al. . |
| 4,511,937 | 4/1985 | Guerrero . |
| 4,800,450 | 1/1989 | Rodal et al. . |
| 5,120,000 * | 6/1992 | Suda ................................. 242/357 |
| 5,150,265 | 9/1992 | Tanaka . |
| 5,222,684 | 6/1993 | Yoneda et al. . |
| 5,309,077 | 5/1994 | Choi . |
| 5,330,118 | 7/1994 | Yoshikawa . |
| 5,343,339 | 8/1994 | Inoue et al. . |
| 5,416,390 | 5/1995 | Choi . |
| 5,418,662 | 5/1995 | Kimura . |
| 5,426,355 * | 6/1995 | Zweighaft ......................... 360/71 X |
| 5,464,167 | 11/1995 | Fujisawa et al. . |
| 5,473,497 | 12/1995 | Beatty . |
| 5,602,694 | 2/1997 | Miles et al. . |
| 5,712,539 * | 1/1998 | Zweighaft et al. . |
| 5,734,518 * | 3/1998 | Hughes ................................ 360/70 |

FOREIGN PATENT DOCUMENTS

| | | |
|---|---|---|
| 4-252456 | 9/1992 | (JP) . |
| 7-72953 B2 | 8/1995 | (JP) . |

* cited by examiner

*Primary Examiner*—John Q. Nguyen
(74) *Attorney, Agent, or Firm*—Nixon & Vanderhye, P.C.

(57) ABSTRACT

A magnetic tape drive (20) employs trolleys (40) for moving magnetic tape between a tape retracted position and a tape extracted position. A trolley position sensor (104, 106) generates a trolley position signal: A processor (100) uses the trolley position signal to control a supply reel motor (30), and thereby prevent slack in tape during a retraction operation. The processor (100) uses the trolley position signal to determine a supply reel motor reference position signal, and then uses a difference between the supply reel motor reference position signal and the supply reel motor position signal to control the supply reel motor (30).

4 Claims, 15 Drawing Sheets

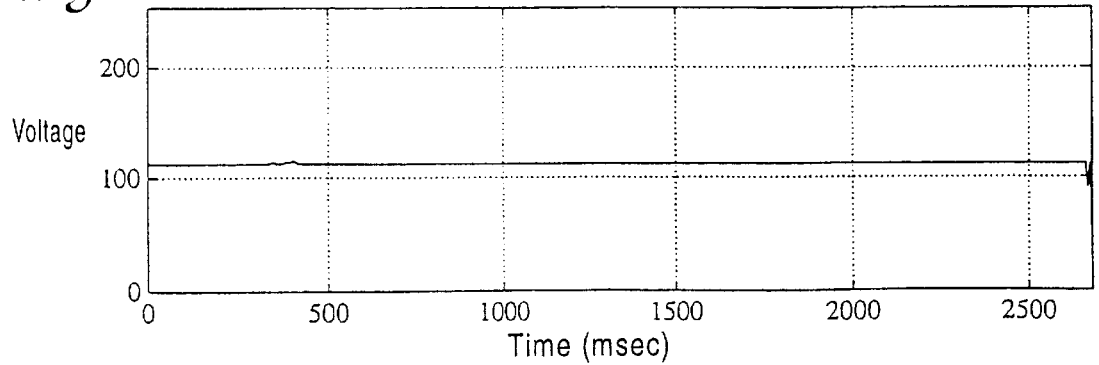
Fig. 8D  Supply Reel Motor Voltage vs. Time (Low Drag on Supply Reel)
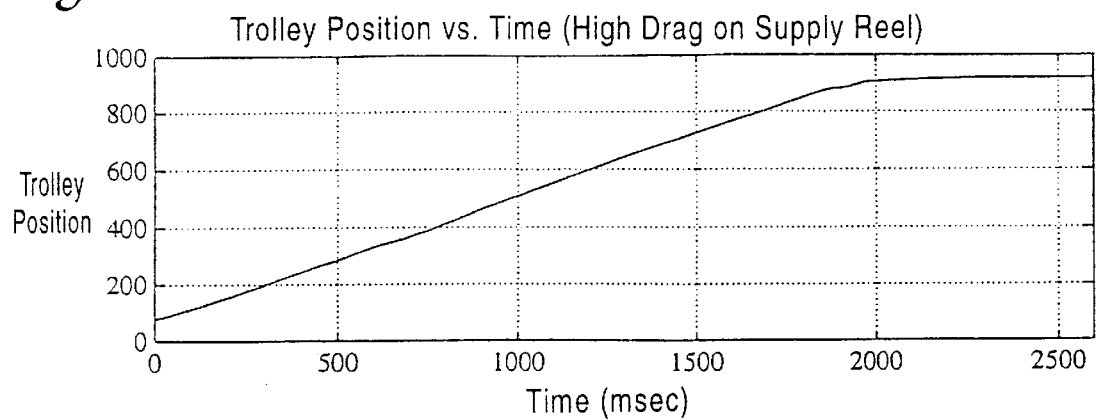
Fig. 9A  Trolley Position vs. Time (High Drag on Supply Reel)
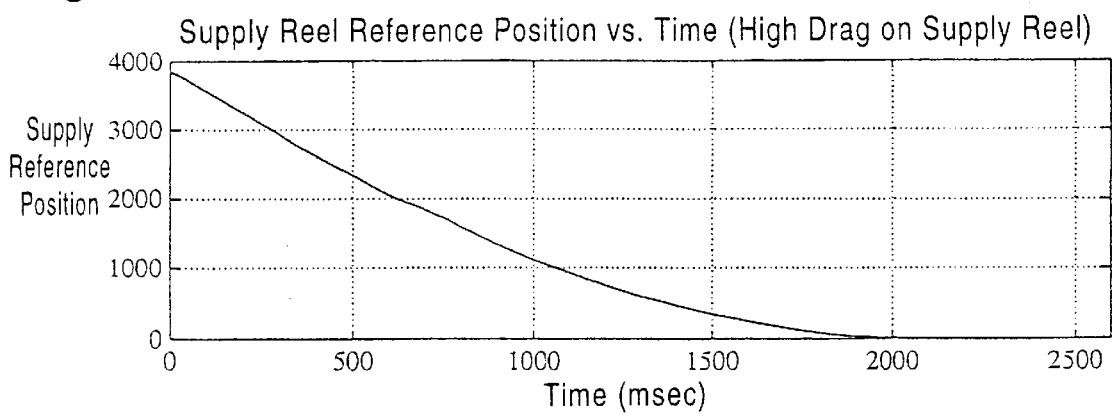
Fig. 9B  Supply Reel Reference Position vs. Time (High Drag on Supply Reel)

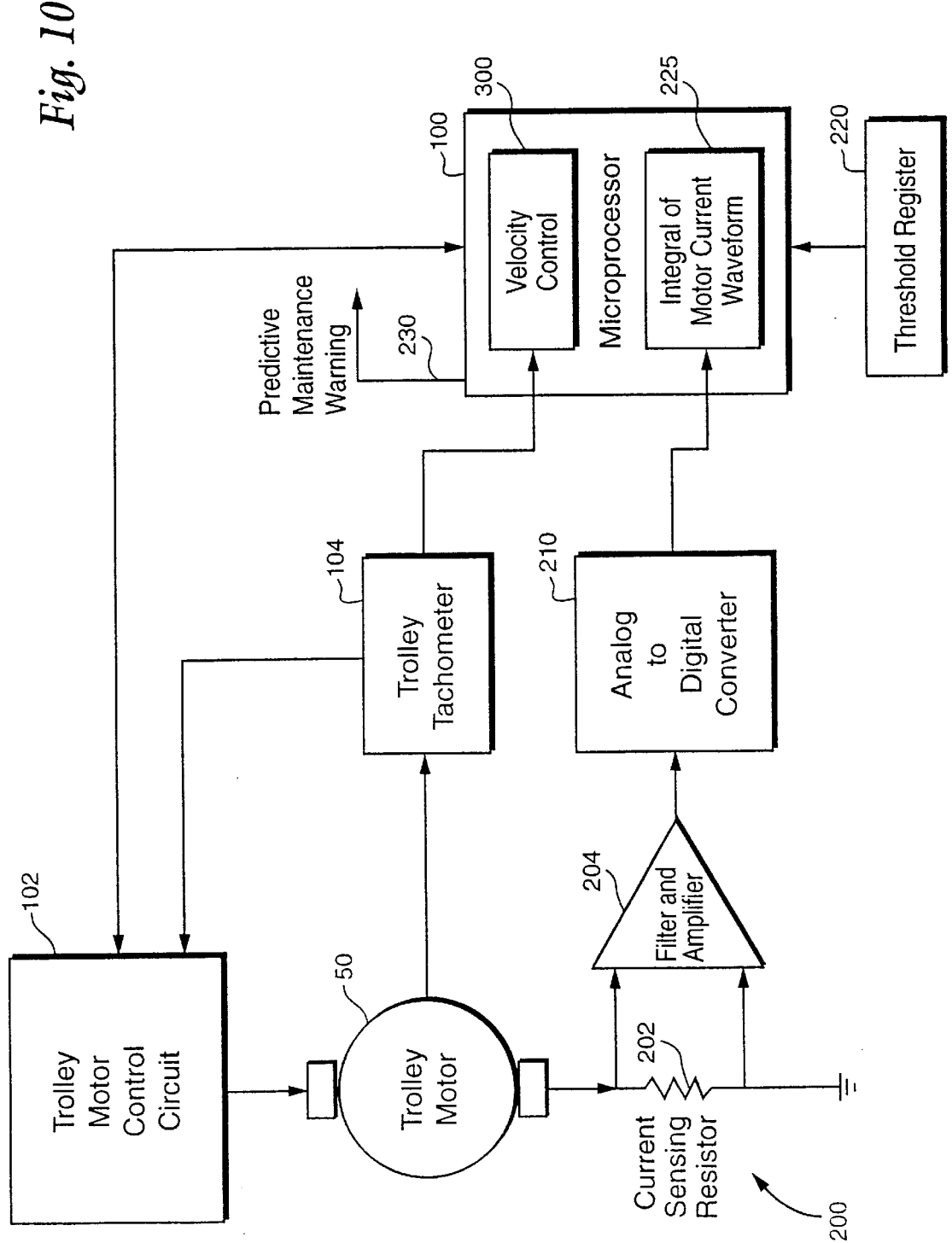

PREVENTING TAPE SLACK IN MAGNETIC TAPE DRIVE

This is a divisional of application Ser. No. 08/824,118, filed Mar. 26, 1997, abandoned.

BACKGROUND

1. Field of Invention

This invention pertains to magnetic tape drives, and particularly to controlling slack tape developing during tape extraction and tape retraction operations.

2. Related Art and Other Considerations

In magnetic recording on tape using a magnetic tape drive, relative motion between a head unit (typically with both a write element and a read element) and the tape causes a plurality of tracks of information to be transduced with respect to the tape. The magnetic tape is typically housed in a cartridge which is loaded into the tape drive. The tape extends between a cartridge supply reel and a cartridge take-up reel. The tape drive typically has a supply reel motor for rotating the cartridge supply reel and a take-up reel motor for rotating the cartridge take-up reel.

After the cartridge is loaded into the tape drive, the tape is extracted by mechanisms in the drive so that a segment of the tape is pulled from the cartridge and into a tape path that travels proximate the head unit. The extraction mechanisms take the form of tape guides which are mounted on trolleys. During the extraction operation, trolley motors move the trolleys along a predefined trolley path, so that the tape guides which surmount the trolleys displace the tape into the tape path as the trolleys travel along the trolley path. When the trolleys reach the full extent of travel along the trolley path, the tape is proximate the head unit. Thereafter the tape can be transported past the head unit, e.g., by activation of a capstan and/or the supply reel and take-up reel motors, depending upon the particular type of transport mechanisms employed. A capstanless tape drive, particularly a tape drive which utilizes helical scan recording, is shown in U.S. Pat. No. 5,602,694 for CAPSTANLESS HELICAL DRIVE SYSTEM to Robert J. Miles and James Zweighaft, which is incorporated herein by reference.

As the tape is transported past the head unit, information can be transduced to or from the tape by the tape drive in recording and reading operations, respectively. When the recording and/or reading operations are concluded, and before the cartridge can be unloaded from the drive, the tape must be retracted for return to the interior of the cartridge. Tape retraction is essentially the reverse of the tape extraction procedure described above.

There is a trend in the tape drive industry toward reduction in thickness and stiffness of magnetic tapes in order to meet the requirements for digital signal recording/reproducing. There is also a demand for greater speed of extracting and retracting of the tape. Both these demands greatly increase the risk of the tape being damaged during a load/unload operation.

A desirable feature in modern tape drives is an operation called "mid-tape load/unload". This operation allows the tape to be extracted without first rewinding back to the beginning of tape. The next time the tape is loaded, it will be ready to resume at the point where the previous read/write operation ended. Without mid-tape load/unload capability, the user or host must wait a significant amount of time for the tape to rewind back to the beginning of tape (BOT) before the tape can be ejected. The subsequent load would then involve searching out on tape to the location where the last operation was halted. This can be a time consuming task which significantly limits system performance.

Preventing tape damage during mid-tape load/unloads is critical since previously written data could be damaged to the point where it is no longer capable of being recovered. Tape damage during mid-tape load/unloads could also cause debris to be generated which can eventually clog the read/write heads on the scanner.

What is needed therefore, and an object of the present invention, is apparatus and method for controlling tape extraction and retraction operations in order reduce the likelihood of damaging tape.

SUMMARY

A magnetic tape drive employs trolleys for moving magnetic tape between a tape retracted position and a tape extracted position. A trolley position sensor generates a trolley position signal. A processor uses the trolley position signal to control a supply reel motor, and thereby prevent slack in tape during a retraction operation.

In a tape retraction operation, a take-up reel is locked while a supply reel is used to gather tape as trolleys are moved to the retraction position. The processor utilizes a derived relationship to form a supply reel motor reference position signal. The supply reel motor reference position signal is a function of supply reel radius and the position of the trolleys along a trolley path. The processor uses a difference between the supply reel motor reference position signal and the supply reel motor position signal to control the torque of the supply reel motor.

The present invention handles torque change by relating the instantaneous trolley position to the desired supply reel position as the tape is wound on to the supply reel during the tape retraction operation. The backdrive voltage to the supply reel is continuously modified according to its deviation from the desired position to provide the correct amount of tape tension.

In accordance with the present invention, mid-tape retractions (e.g., mid-tape loads) are also performed without damaging the media. The invention adapts to any radius of tape which is on the supply reel at the time of the mid-tape retraction. The supply reel radius at that time, along with the trolley position, is used to create a desired supply reel position throughout the entire retraction motion. By so doing, the proper amount of torque is applied to the supply reel motor to provide for gentle tape handling. This ensures that tape is not damaged and that recorded data is not lost.

The trolleys are activated by a trolley motor. The trolley motor has a sensor which senses the electrical current through the trolley motor and which generates a signal indicative thereof. The processor utilizes the signal generated by the sensor for generating a predictive maintenance warning indication. In particular, the processor utilizes the signal generated by the sensor for generating an integral of the motor current. The processor generates the predictive maintenance warning indication when the integral of the motor current exceeds a predetermined threshold value.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 8D is a graph showing a supply reel motor voltage signal verses time as a trolley of a tape drive of an embodiment of the present invention moves from a tape extraction position to a tape retraction position under a condition having low drag on the supply reel.

FIG. 9A is a graph showing trolley position signal verses time as a trolley of a tape drive of an embodiment of the present invention moves from a tape extraction position to a tape retraction position under a condition having high drag on the supply reel.

FIG. 9B is a graph showing supply reel reference position signal verses time as a trolley of a tape drive of an embodiment of the present invention moves from a tape extraction position to a tape retraction position under a condition having high drag on the supply reel.

FIG. 10 is a schematic view of electronics included in a tape drive of an embodiment of the present invention for monitoring performance of the tape drive.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1A:
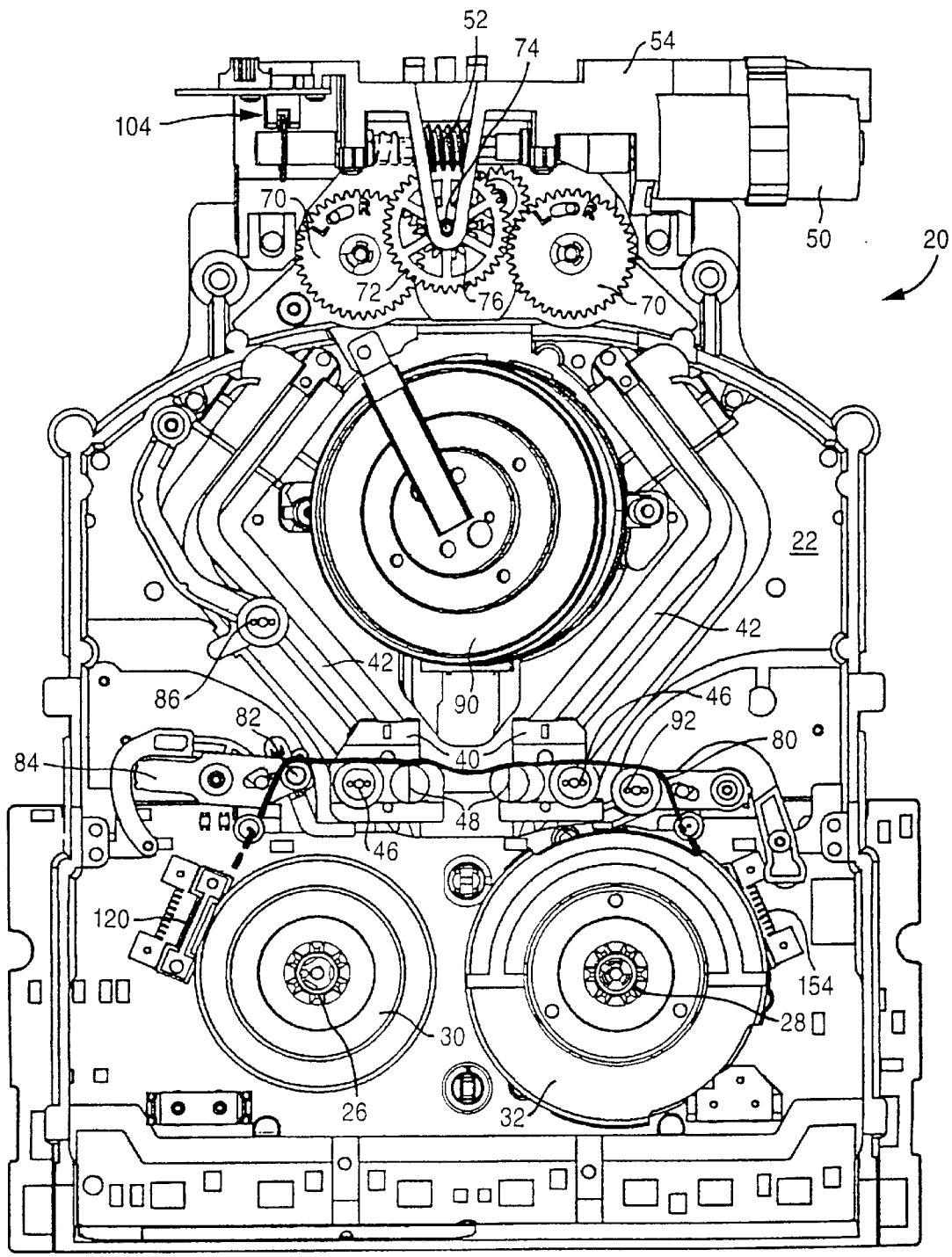
FIG. 1A is a top view of a tape drive of an embodiment of the present invention, with a tape drive housing cover removed, and showing trolleys in a tape full retraction position.

FIG. 1A shows a tape drive 20 having a chassis 22 which is visible by virtue of removal of an unillustrated drive housing cover. Tape drive 20 includes a supply reel spindle 26 and a take-up reel spindle 28, which are respectively rotatably driven by supply reel motor 30 and take-up reel motor 32. When, for example, a magnetic tape cartridge is inserted into a cartridge slot in a front face of the unillustrated housing of drive 20, a supply reel of the cartridge and a take-up reel of the cartridge ultimately extend over spindles of respective supply reel spindle 26 and take-up reel spindle 28.

Details of supply reel hub 26 and a take-up reel hub 28 are shown in U.S. Pat. No. 5,602,694 for CAPSTANLESS HELICAL DRIVE SYSTEM to Robert J. Miles and James Zweighaft, which is incorporated herein by reference. Details of the supply reel motor 30 and the take-up reel motor 32 are understood with reference to one or more of the following (all of which are incorporated herein by reference): U.S. patent application Ser. No. 08/483,521 of Zweighaft et al. entitled DIGITAL ACOUSTIC NOISE REDUCTION IN ELECTRIC MOTORS DRIVEN BY SWITCHING POWER AMPLIFIERS; U.S. Pat. No. 5,426,355 to Zweighaft entitled POWER-OFF MOTOR DECELERATION CONTROL SYSTEM.

Figure 2C:
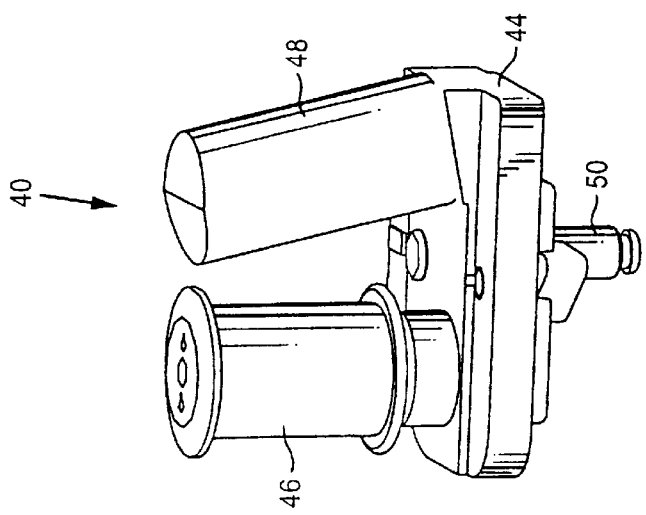
FIG. 2C is a perspective view of the trolley of FIG. 2A.
Figure 2A:
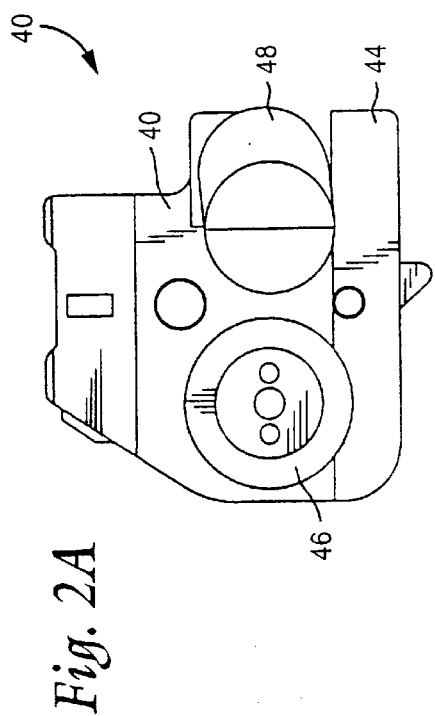
FIG. 2A is a top view of a trolley of a tape drive according to an embodiment of the present invention.
Figure 2B:
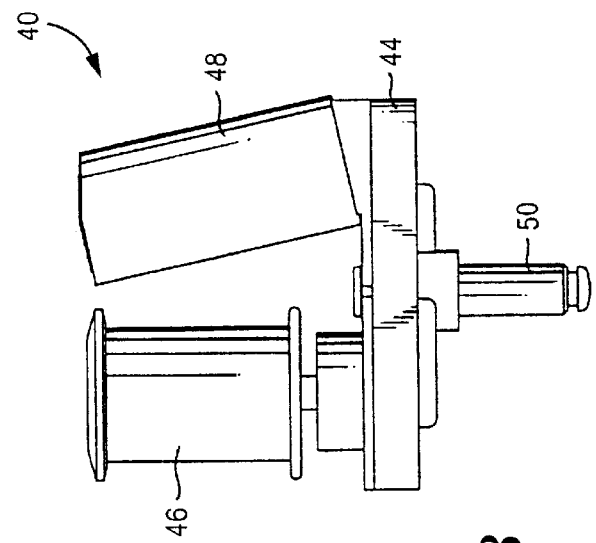
FIG. 2B is a side view of the trolley of FIG. 2A.

Tape drive 20 also includes two trolleys 40 which are utilized to move tape between a tape retracted position and a tape extracted position. The two trolleys 40 travel along respective trolley paths 42 which are grooves formed in chassis 22. Trolleys 40, shown in more detail in FIG. 2A, FIG. 2B, and FIG. 2C, each comprise a trolley carriage 44 upon which tape guides 46 and 48 are mounted. Carriage 44 of each trolley 40 has a trolley pin 50 underneath. Trolley pin 50 extends vertically into the groove which forms trolley path 42.

When trolleys 40 are at an extreme front extent of trolley paths 42 as shown in FIG. 1A, any tape extending between the supply reel and the take-up reel is said to be in a tape fully retracted position. In the tape fully retracted position, the tape remains in the cartridge and extends between the tape supply reel and the take-up reel in essentially the same manner as if the cartridge were not inserted into the drive. While in the tape fully retracted position, tape guides 46 and 48 do not displace the tape from the nominal tape position of the cartridge.

Figure 3:
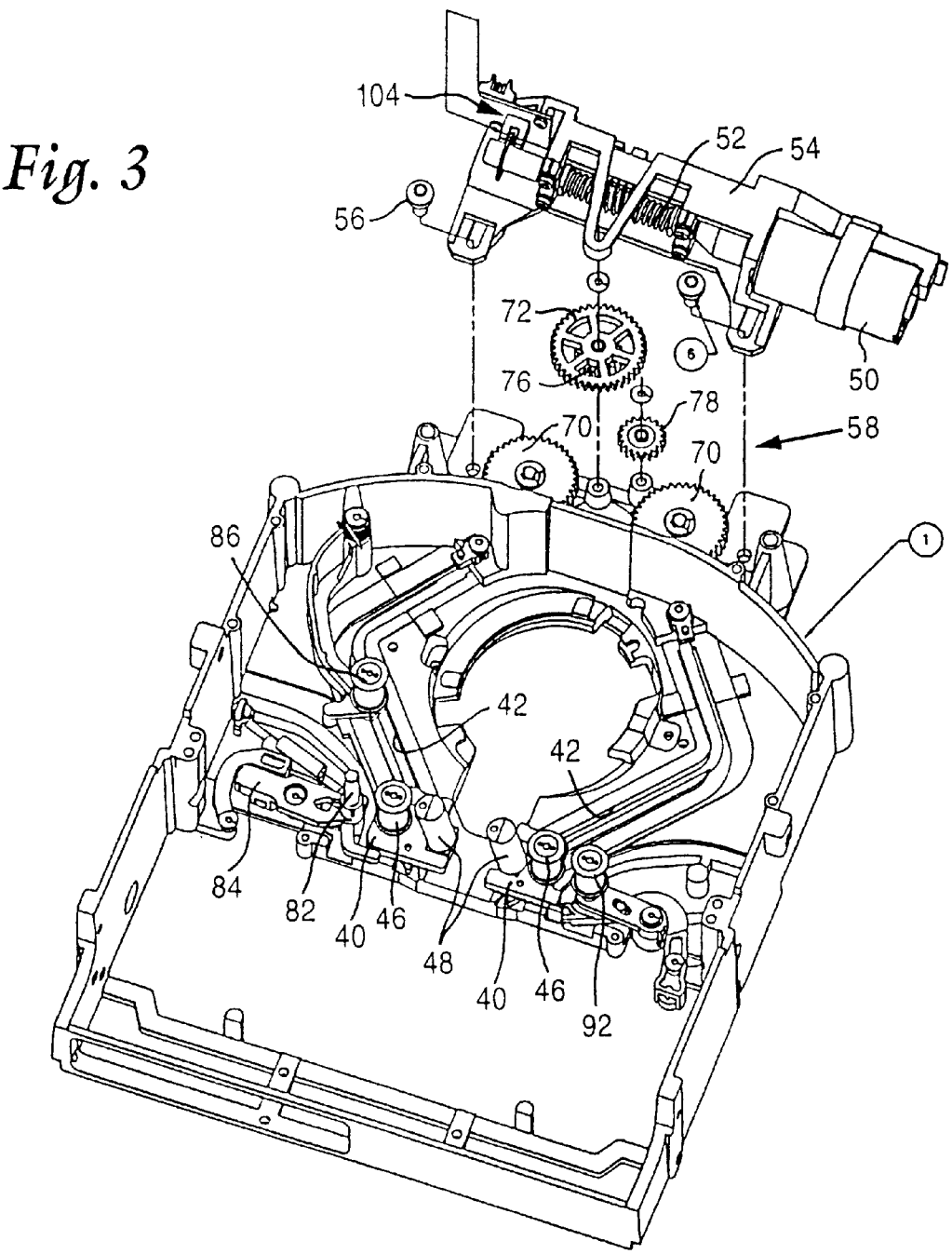
FIG. 3 is a top perspective view, partially exploded, of a tape drive of an embodiment of the present invention, with various elements removed for clarity.

Trolleys 40 travel along trolley paths 42 by being secured to a trolley transmission system. A trolley motor 50 acts through the trolley transmission system to move trolleys 40 along paths 42. AS shown in FIG. 3, for example, trolley motor 50 has a helically threaded output shaft or gear 52. Trolley motor 50 is carried by motor bracket assembly 54. Motor bracket assembly 54 is secured to chassis 22 by fasteners 56.

Figure 4:
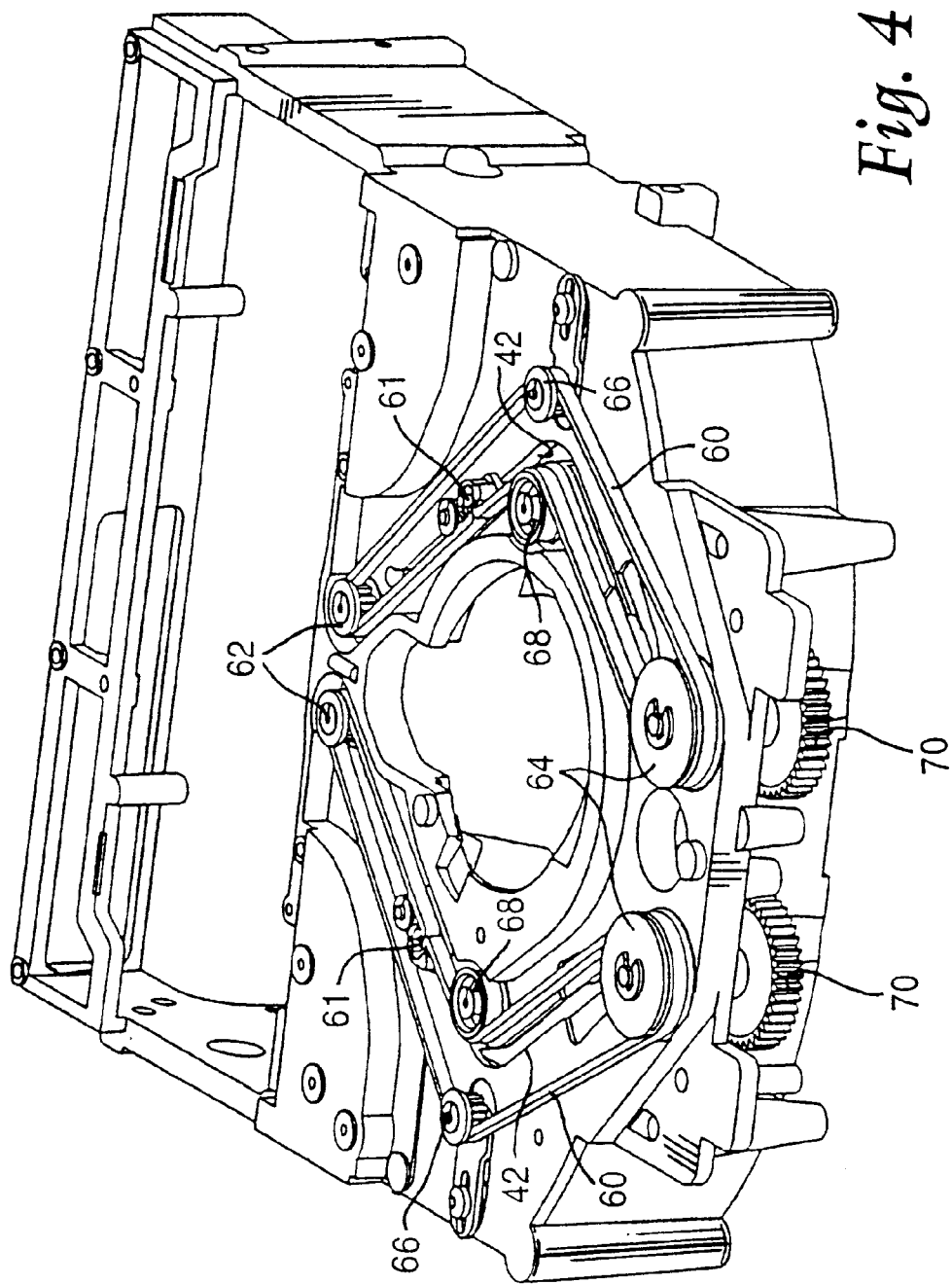
FIG. 4 is a bottom perspective view of a tape drive of an embodiment of the present invention, with various elements removed for clarity.

The trolley transmission system includes a set of gears 58 and trolley transmission belt 60. Each trolley 40 is secured to trolley transmission belt 60 by a clip device 61. FIG. 4 shows an exposed underside of tape drive 20, in which trolley transmission belts 60 are visible. Trolley transmission belts 60 are each entrained about trolley front pulley 62, trolley rear pulley 64, and trolley intermediate pulleys 66 and 68. Trolley rear pulleys 64 are mounted at first ends of shafts which have trolley overtravel gears 70 on their opposite ends. Gears 70, along with gears 72, 76, and 78, form gear set 58.

Gear 72, carried by bracket 54, rotates about an unillustrated shaft and meshes with helically threaded gear 52. Under gear 72 and also mounted to the shaft for uniform rotation with gear 72 is gear 76, which has a smaller diameter than gear 72. One of the gears 70, shown as a left one of the two gears 70 in FIG. 3, meshes with gear 74. The other of the gears 70, shown as a right one of the two gears 70 in FIG. 3, meshes with an auxiliary gear 78. Auxiliary gear 78 in turn meshes with gear 74. Thus, by virtue of meshing at least ultimately with gear 74, and since gear 74 rotates in accordance with the meshing of gear 72 with motor-driven helical gear 52, gears 70 rotate together as the helically geared output shaft 52 of motor 50 rotates. Simultaneous rotation of gears 70 causes simultaneous movement of trolley transmission belts 60, and thus of trolleys 40.

Figure 1B:
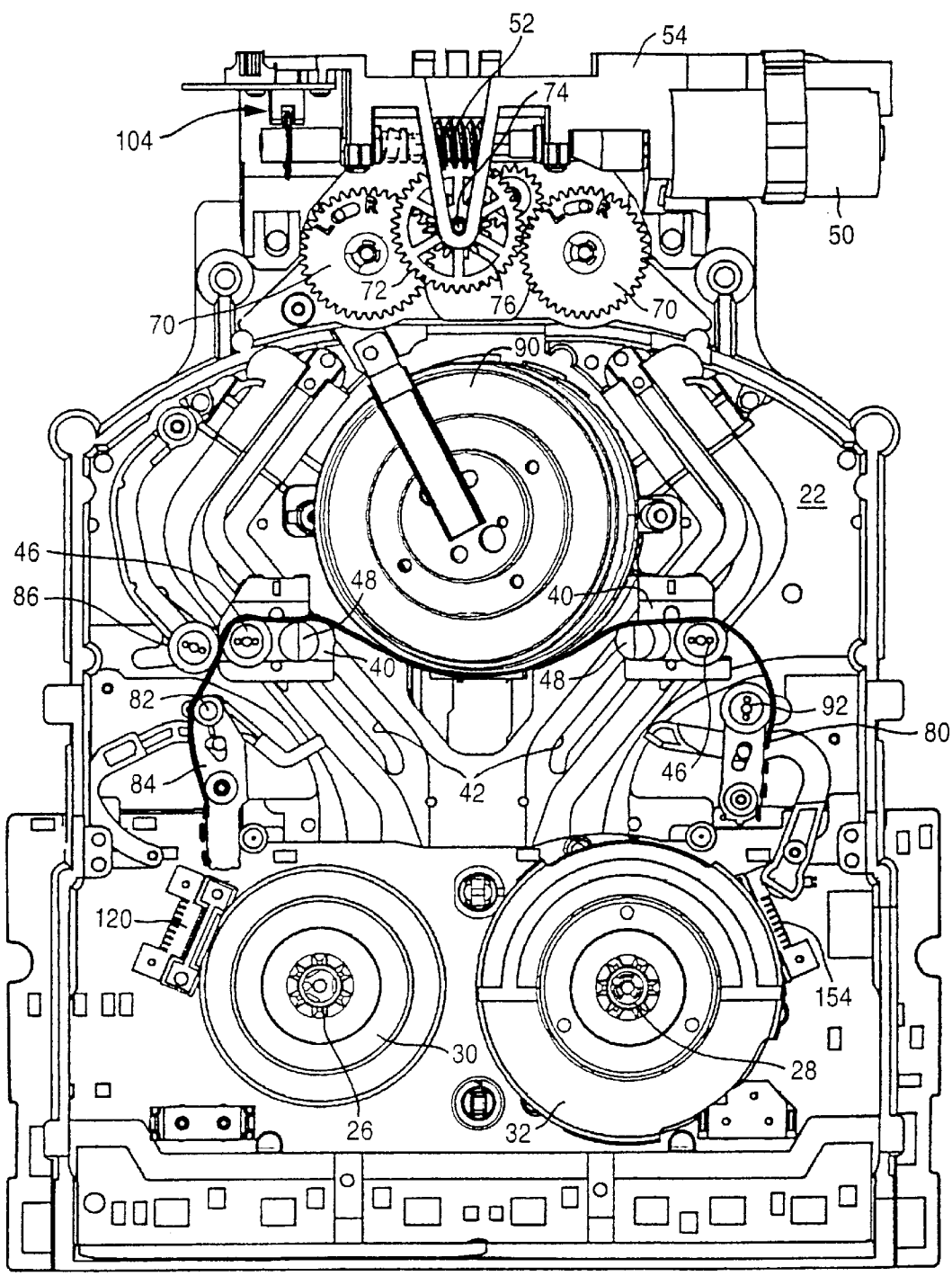
FIG. 1B is a top view of a tape drive of an embodiment of the present invention, with a tape drive housing cover removed, and showing trolleys half way between a tape full retraction position and a tape full extraction position.
Figure 1C:
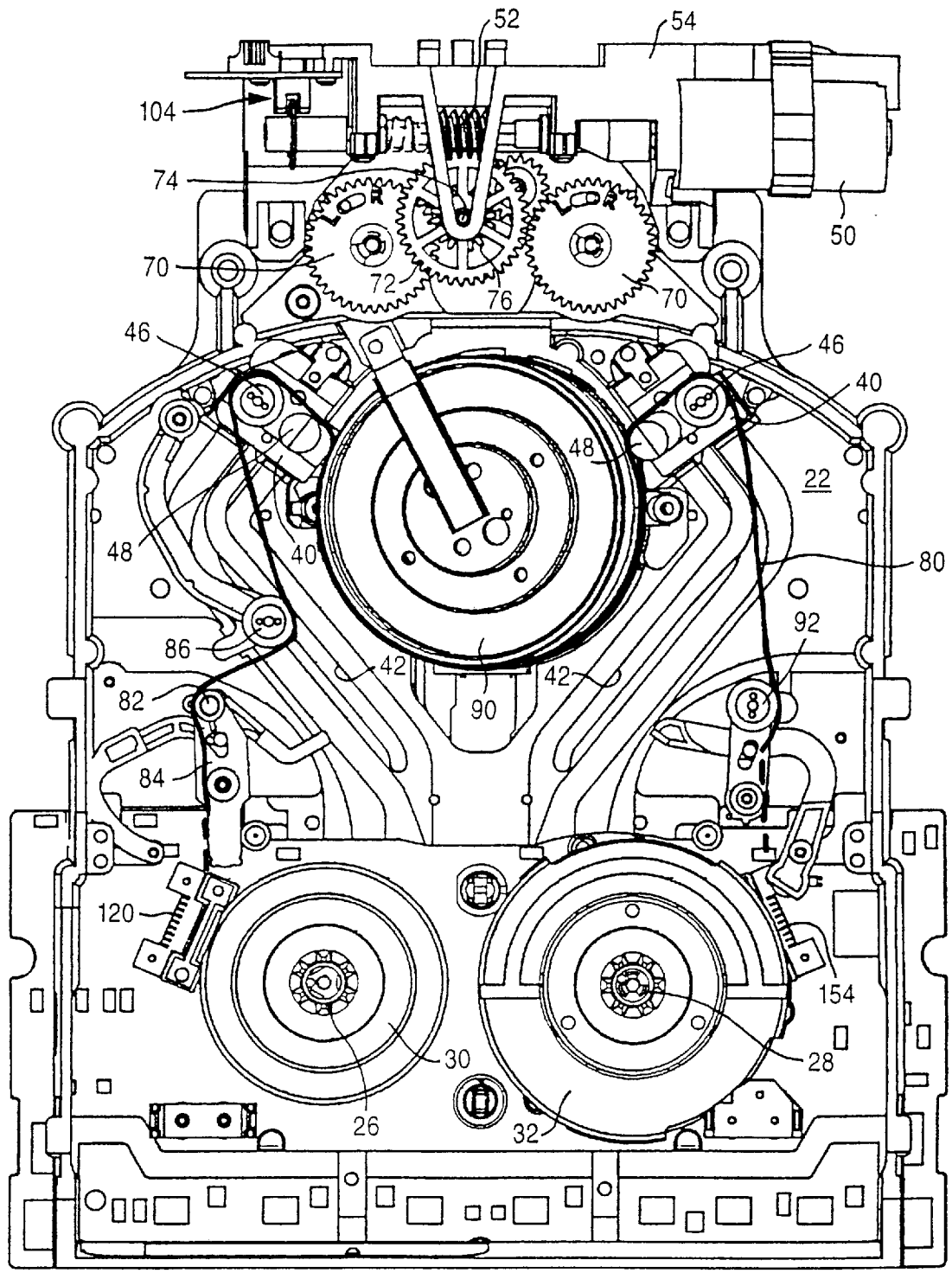
FIG. 1C is a top view of a tape drive of an embodiment of the present invention, with a tape drive housing cover removed, and showing trolleys in a tape full extraction position.

The system for movement of trolleys 40 having been described, it is understood how trolleys 40 move along trolley path 42. From the tape fully retracted position described above and illustrated in FIG. 1A, and upon generation of an tape extraction signal by tape drive 20, trolleys 40 move rearwardly into the drive along trolley path 42. FIG. 1B shows trolleys 40 half way between a tape fully retracted position and a tape fully extracted position. FIG. 1C shows trolleys at the tape fully extracted position.

At the tape fully extracted position shown in FIG. 1C, the tape extends around an operative tape path of tape drive 20. Line 80, as shown in FIG. 1C, depicts both the tape and the operative tape path. As shown in FIG. 1C, the tape extends around tape guide 82 provided on swing arm 84; around tape guide 86; around tape guides 46 and 48 of a first trolley 40; around a portion of the periphery of drum or scanner 90; around tape guides 48 and 46 of a second trolley 40; and around tape guide 92. In the fully extracted position, unillustrated read and write heads mounted on the periphery of drum 90 travel along helical paths of the tape.

Some skilled in the art refer to tape extraction operation as being a tape load operation and a tape retraction operation as being a tape unload operation. While the present document chooses the "extraction" and "retraction" terminology primarily to avoid confusion with cartridge loading (into the drive) operations and cartridge unloading (from the drive) operations (as distinguished from tape loading and tape unloading), it should be understood that other terminology as such tape load and unload can be used to describe the extraction and retraction operations of the present invention.

Figure 5:
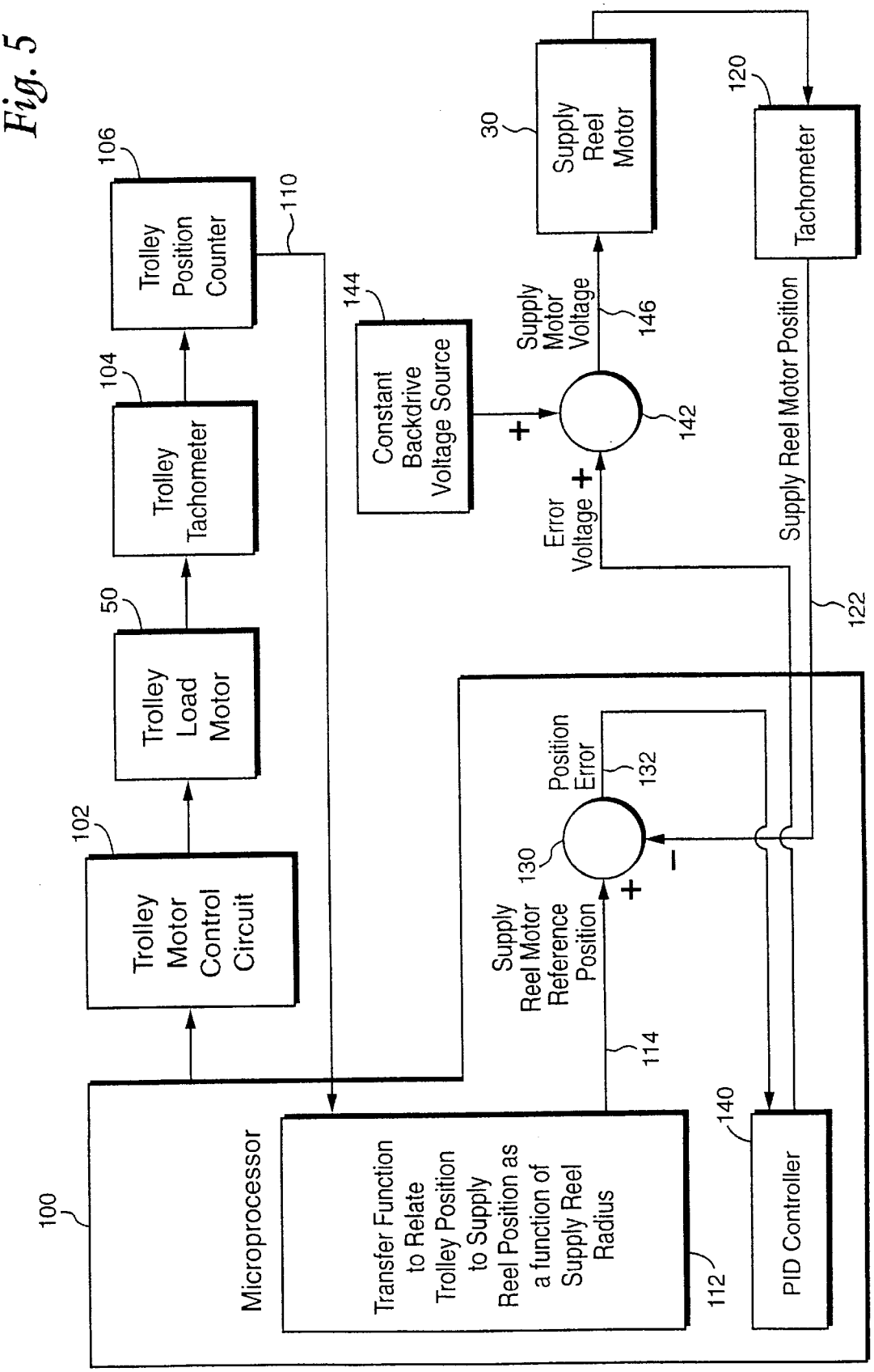
FIG. 5 is a schematic view of a first portion of electronics included in a tape drive of an embodiment of the present invention.

FIG. 5 shows motor and electronics components of tape drive 20 pertinent to the present invention. FIG. 5 particularly illustrates a processor 100 (shown as a microprocessor) which executes coded instructions to perform operations hereinafter described. Processor 100 has a PWM output line connected to trolley motor control circuit 102. Trolley motor control circuit 102 uses the PWM signal outputted by processor 100 to control trolley motor 50. Trolley motor 50 has an associated tachometer 104, shown in FIG. 1A in the form of a photointerrupter which creates electrical pulses when a peripherally toothed disk, mounted on the output shaft of motor 50, permits transmission of light from a transmitter to a receiver of the photointerrupter. The pulses generated by trolley tachometer 104 are transmitted to a trolley position counter 106. Trolley position counter 106 counts the pulses received from trolley tachometer 104 and generates a trolley position signal on line 110.

The trolley position signal on line 110 is applied to processor 100, and is particularly utilized by a portion of the coded instructions known as transfer function 112. Transfer function 112 relates the value of the trolley position signal on line 110 to a supply reel position as a function of the radius of the supply reel in order to generate a signal on line 114 known as the supply reel motor reference position signal.

Supply reel motor 30 rotates in accordance with a supply motor voltage applied thereto. The rotational speed of supply reel motor 30, and hence of the supply reel which surmounts spindle 26, is sensed by supply reel motor tachometer 120 (see FIG. 1A and FIG. 5). Supply reel motor tachometer 120 generates a supply reel motor position signal on line 122.

An adder 130 calculates the difference between the supply reel motor reference position signal applied on line 114 and the supply reel motor position signal applied to line 122 to generate a position error signal on line 132. The position error signal is applied to processor 100, and particularly to a portion of its coded instructions which forms a proportional integral differential (PID) controller 140. The PID controller 140 function of processor 100 generates an error voltage signal which is based on the proportion error, the integral of the error, and the derivative of the error. The error voltage signal is applied as a first input to adder 142, a second input to adder being from a constant backdrive voltage source 144. The output of adder 142 is the supply motor voltage for supply reel motor 30 which is applied on line 146.

Figure 6:
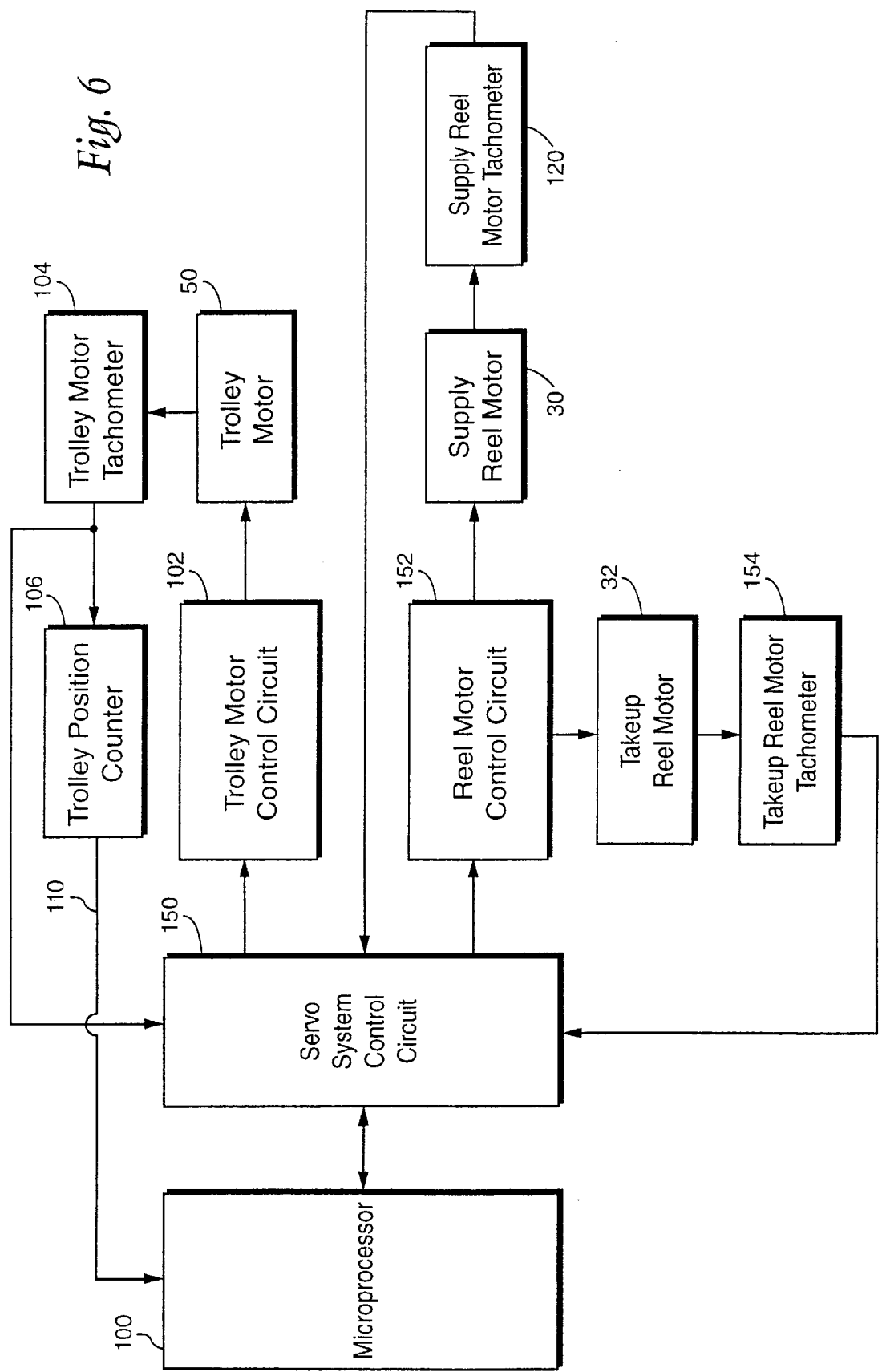
FIG. 6 is a schematic view of a second portion of electronics included in a tape drive of an embodiment of the present invention.

FIG. 6 shows connection of processor 100 to a servo system control circuit 150. Servo system control circuit 150 has outputs for controlling trolley motor control circuit 102 and reel motor control circuit 152. Trolley motor control circuit 102 controls trolley motor 50 in the manner described in FIG. 5, with trolley tachometer 104 and trolley position counter 106 generating the trolley position signal on line 110.

Reel motor control circuit 152 controls both supply reel motor 30 and take-up reel motor 32. The rotational speed of supply reel motor 30 is sensed by supply reel motor tachometer 120; the rotational speed of take-up reel motor 32 is sensed by take-up reel motor tachometer 154 (see FIG. 6 and FIG. 1A).

Thus, FIG. 6 illustrates three closed-loop servo systems which are employed during a tape retraction operation. Processor 100 interfaces with servo system control circuit 150, which in turn is responsible for driving trolley motor 50; supply reel motor 30; and take-up reel motor 32. Each motor 50, 30, and 32 is equipped with a respective tachometer 104, 120, 154 which is interfaced to servo system control circuit 150. Servo system control circuit 150 uses the tachometer signals to provide motor position and velocity information to processor 100. Processor 100 then makes the necessary calculations to provide position and velocity references for the three motors 50, 30, and 32.

FIG. 5 shows various operations, including how processor 100 is used to control operation of trolleys 40. At the beginning of a tape retraction operation, processor 100 (via servo system control circuit 150) puts take-up reel motor 32 in a stop-lock mode, so that all tape can be wound onto the supply reel as supply reel motor 30 is eventually rotated during the tape retraction operation. Then, processor 100 sends a command to trolley motor control circuit 102, which drives trolley motor 50 to move trolleys 40 from the tape extracted position of FIG. 1C to the tape retracted position of FIG. 1A. While trolleys 40 are moving along trolley path 42, information about the position of trolleys 40 is acquired by trolley tachometer 104 and trolley position counter 106. Trolley position signal on line 110 is sent to processor 100, which computes a reference supply reel motor position value and applies a signal therefor on line 114. As explained hereinafter, the reference supply reel motor position signal takes into account the radius of the tape on the supply reel. The supply reel motor reference position signal on line 114 is compared to the actual supply reel position, e.g., the supply reel motor position signal on line 122 (derived from supply reel tachometer 120). The difference between the supply reel motor position signal and the supply reel motor reference position signal is sent to processor 100 where the PID controller function 140 thereof computes an error voltage signal. The error voltage signal is then added or subtracted from a predetermined backdrive voltage in order to make the supply reel motor position match the reference position. By forcing the supply reel motor position to be related to the trolley position during the retraction operation, it is ensured that the correct amount of tension is applied to the tape.

Transfer function 112, shown in FIG. 5 as being executed by processor 100, is appropriately formulated in view of the particular tape drive and particular source of tape (e.g,. type of tape cartridge) with which the tape drive operates. In the present embodiment, one of three differing transfer functions can be selected: a first order transfer function, a second order transfer function, or a third ordhese transfer functions are equations which relate supply reel motor position to the position of trolleys 40 during the tape retraction operation. The transfer functions are as follows:

Equation 1 (first order transfer function):

$$y=-11.66*x+-39.9$$

Equation 2 (second order transfer function):

$$y=0.01113*x^2+-23.2*x+2173$$

Equation 3 (third order transfer function):

$$y=1.405e-05*x^3+-0.0106*x^2+-13.71*x+1131$$

The transfer functions were obtained during respective calibration operations by measuring the supply reel motor position and trolley position every millisecond during the tape retraction operation. In particular, the equations were derived for a Mammoth™ helical scan recorder manufactured by Exabyte Corporation, using a cartridge which had a supply reel tape pack radius of 0.809 cm.

In order to handle the range of supply reel radii expected to be encountered (from 0.8 cm to 2.1 cm), the equations must be normalized upon each computing of the supply reel motor reference position signal. In particular, at each computation of the supply reel motor reference position signal the appropriate equation (either equation 1, 2, or 3) is normalized by (1) multiplying the equation by a calibration-related supply reel radius multiplier (e.g., 0.809 for the cartridge mentioned above) and (2) dividing the equation by the supply reel radius at the time of the tape retraction, i.e., the instantaneous or current supply reel radius. Thus, for the calibration example discussed above, the transfer function is multiplied by the following normalization factor: [0.809/current_$_{supply}$_reel_radius].

The value of the current supply reel radius (e.g, current_supply_reel_radius) is readily known by processor 100. For example, when the tape is extracted, an initial supply reel radius value can be determined by any of various techniques, including that set forth in U.S. patent application Ser. No. 08/476,367 filed Jun. 7, 1995 and entitled "HELICAL SCAN RECORDER METHOD AND APPARATUS", which is incorporated herein by reference. Once an initial supply reel radius value is ascertained, processor 100 uses any one of a number of known and common procedures for updating the supply reel radius value in order to obtain the current supply reel radius. Thus, when a tape retraction operation is necessary, an exact current supply reel radius is known by processor 100 for determining the supply reel motor reference position signal on line 114.

Figure 7A:
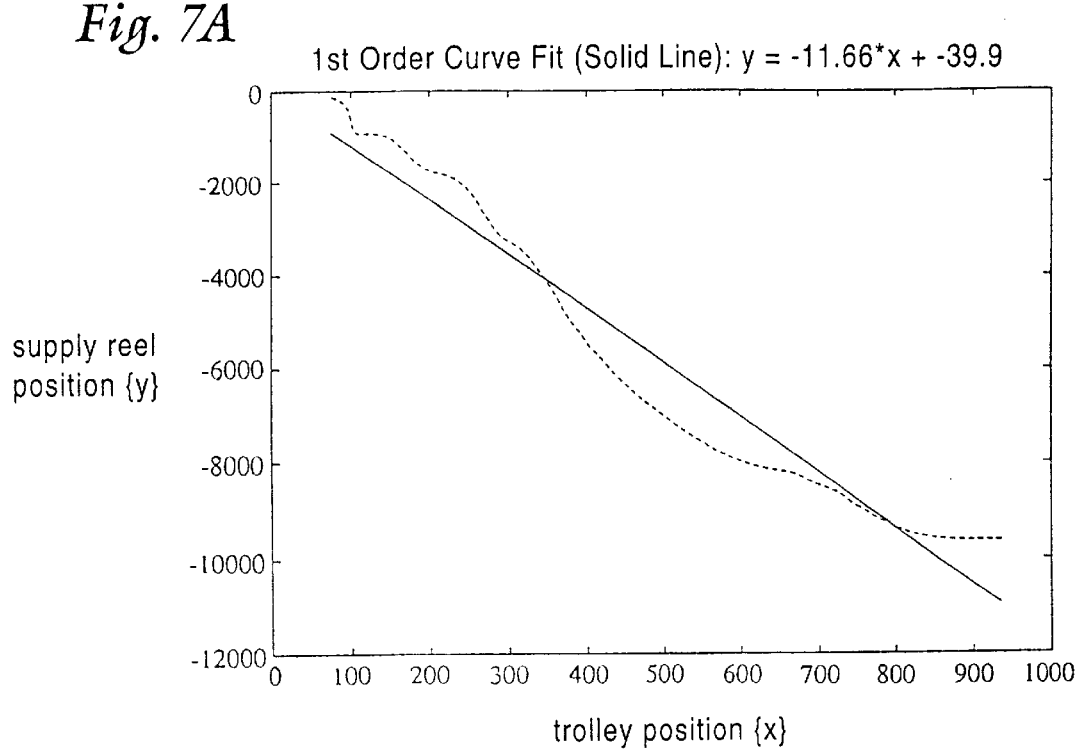
FIG. 7A is a graph representing a first order curve fit for a transfer function implemented by a controller of a tape drive of an embodiment of the present invention.
Figure 7B:
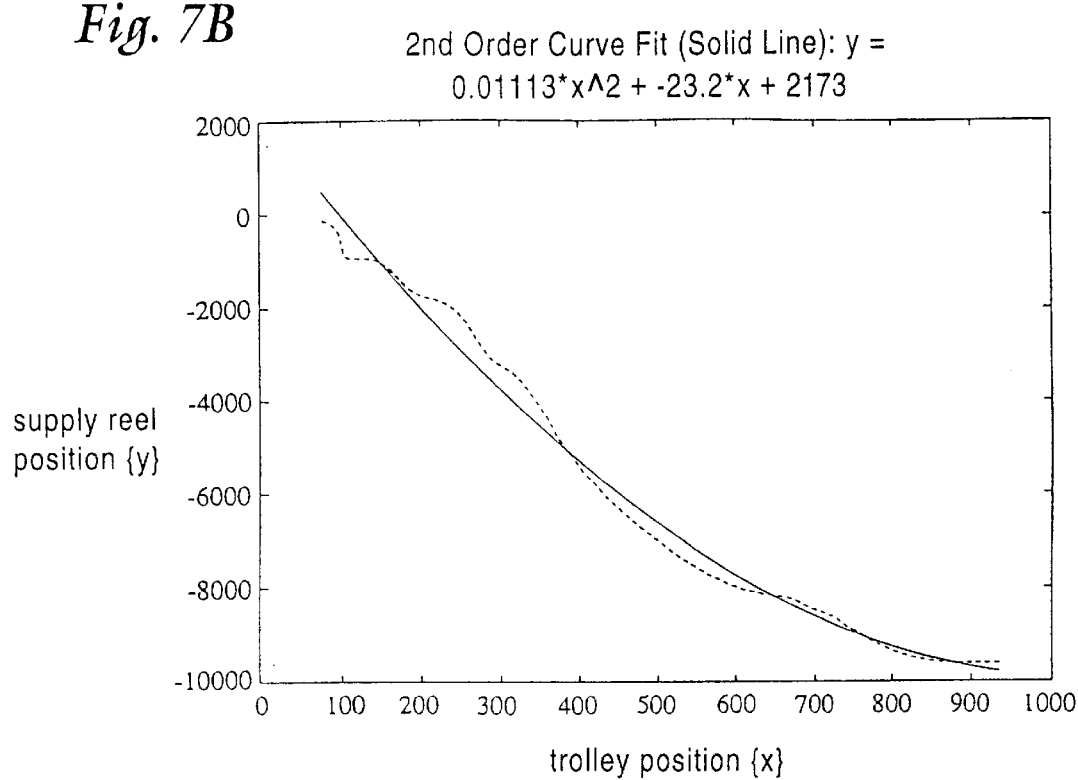
FIG. 7B is a graph representing a second order curve fit for a transfer function implemented by a controller of a tape drive of an embodiment of the present invention.
Figure 7C:
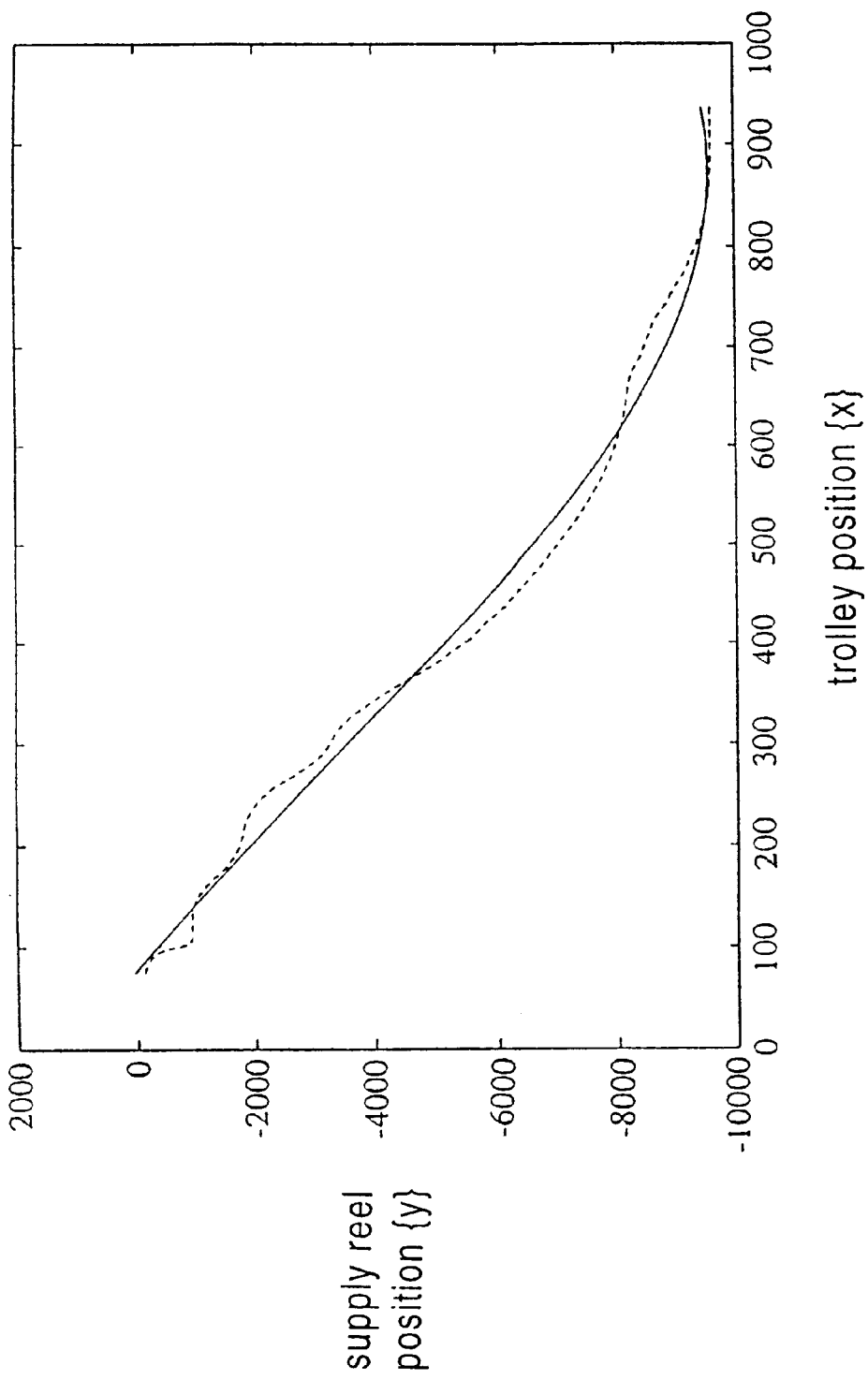
FIG. 7C is a graph representing a third order curve fit for a transfer function implemented by a controller of a tape drive of an embodiment of the present invention.

FIG. 7A, FIG. 7B, and FIG. 7C are plots of a supply reel motor position signal versus trolley position during the tape retraction procedure using the first order, second order, and third order transfer functions, respectively, for a Mammoth™ tape drive. FIG. 7A, FIG. 7B, and FIG. 7C are thus supply reel position reference profiles which correspond to the position of trolleys 40 during the retraction operation. For this specific tape drive, the motor position counter circuits count down for Counter-Clock-Wise (CCW) motion and count up for CW motion. Supply reel motor 30 moves in the CCW direction as tape is wound up during the retraction, explaining why the plot shows decreasing supply reel position as trolleys 40 move from position 0 to 900. The dashed line represents the actual data taken from a tape drive during retraction operation. The solid line represents a curve fit approximation to the actual data. Any of the curve fit equations can be used depending on the accuracy required and the speed at which the processor 100 is capable of computing the output of the equation. The curve fit equation is what processor 100 uses to compute a supply reel motor reference position based on the current position of trolleys 40. As mentioned above, this output of the equation is then scaled (e.g., normalized) to account for the current radius of tape on the supply reel hub.

Figure 8A:
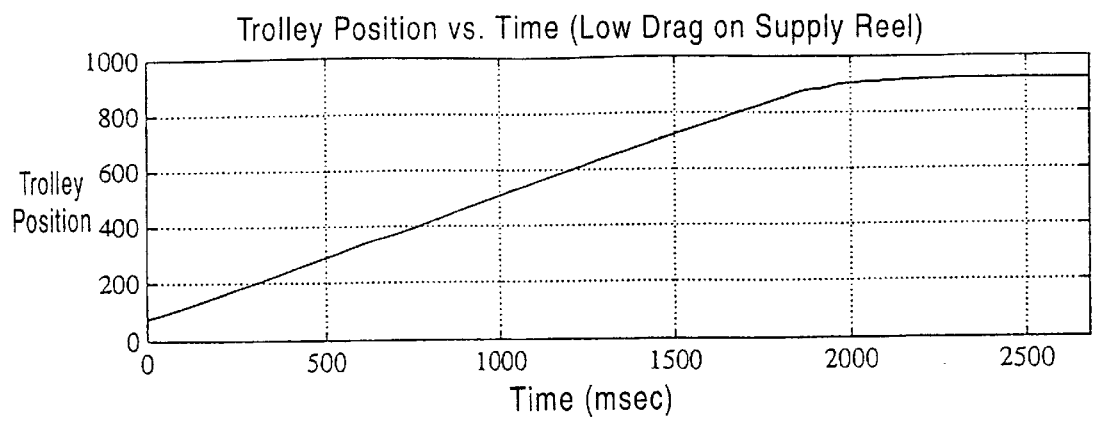
FIG. 8A is a graph showing trolley position signal verses time as a trolley of a tape drive of an embodiment of the present invention moves from a tape extraction position to a tape retraction position under a condition having low drag on the supply reel.
Figure 8B:
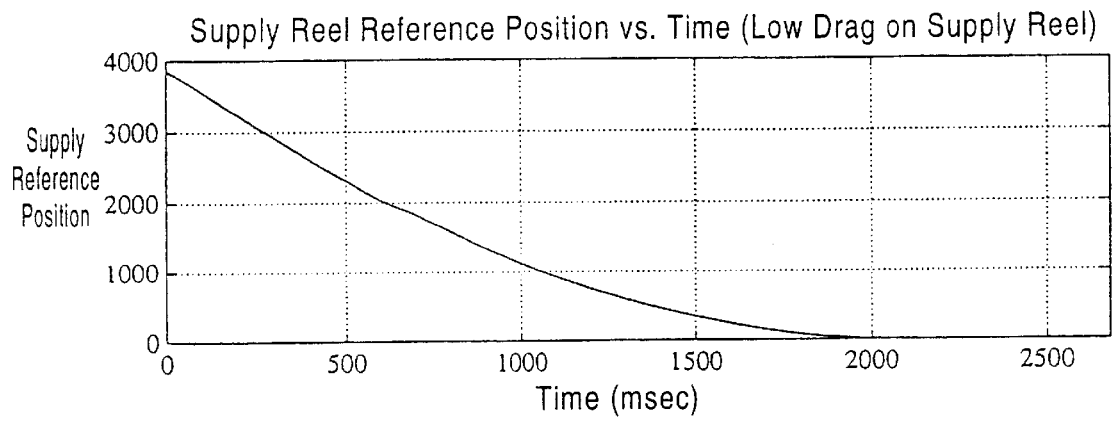
FIG. 8B is a graph showing supply reel reference position signal verses time as a trolley of a tape drive of an embodiment of the present invention moves from a tape extraction position to a tape retraction position under a condition having low drag on the supply reel.
Figure 8C:
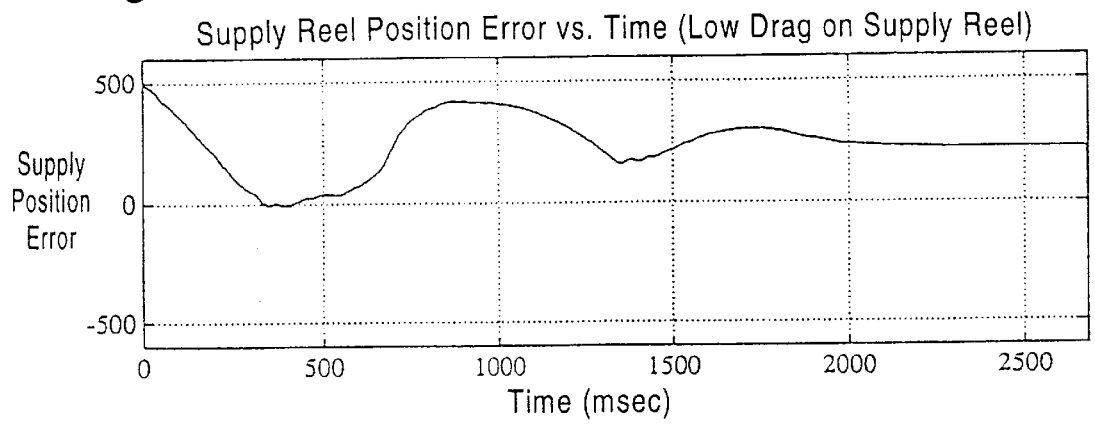
FIG. 8C is a graph showing a supply reel position error signal verses time as a trolley of a tape drive of an embodiment of the present invention moves from a tape extraction position to a tape retraction position under a condition having low drag on the supply reel.
Figure 9C:
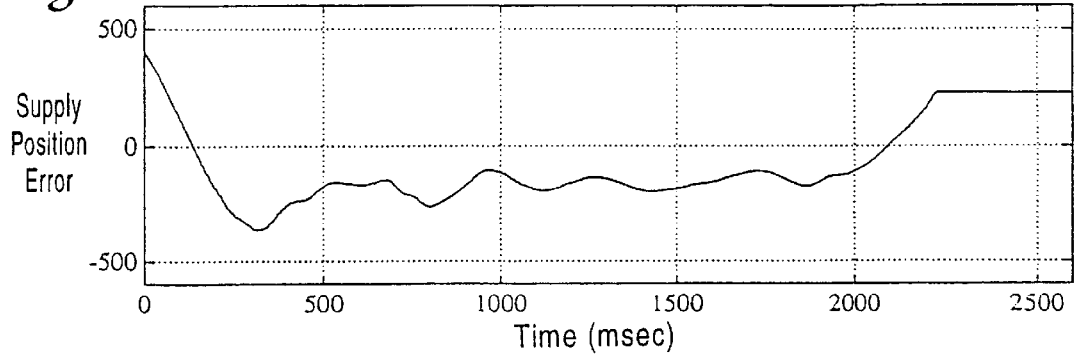
FIG. 9C is a graph showing a supply reel position error signal verses time as a trolley of a tape drive of a tape retraction position under a condition having high drag on the supply reel.
Figure 9D:
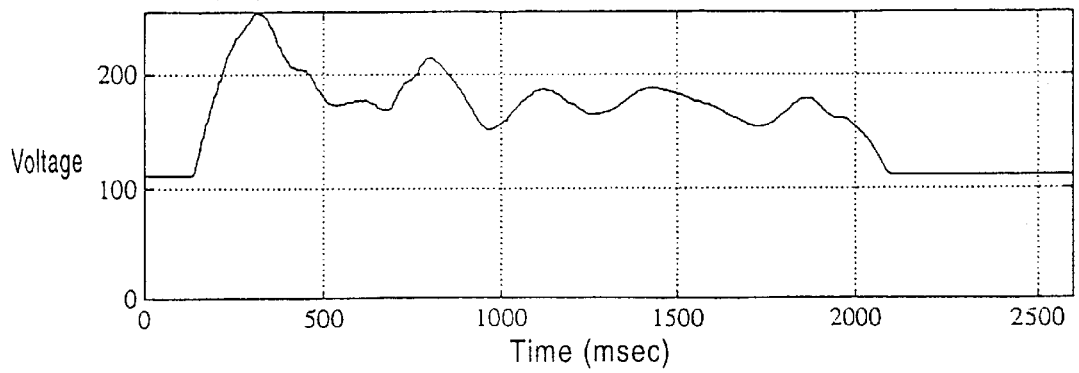
FIG. 9D is a graph showing a supply reel motor voltage signal verses time as a trolley of a tape drive of an embodiment of the present invention moves from a tape extraction position to a tape retraction position under a condition having high drag on the supply reel.

As a function of time, FIG. 8A, FIG. 8B, FIG. 8C and FIG. 8D show values of signals on lines 110 (trolley position signal), 114 (supply reel motor reference position signal), 132 (position error signal), and 146 (supply reel motor voltage signal) for the case of a low drag tape drive. A normal tape unload situation with low drag on the supply reel occurs, for example, with a relatively new tape drive that does not have much mechanical wear or debris and which is operating under nominal voltage and motor parameters. FIG. 8A shows the trolley position signal on line 110 versus time as trolleys 40 move from the tape extracted to the tape retracted position. FIG. 8B shows the reference supply reel position signal on line 114 which the processor 100 computes based on trolley position, supply reel hub radius, and a curve-fit equation. FIG. 8C shows the supply reel position error signal on line 132. A positive error means that the supply reel is slightly ahead of the reference position (for this particular setup the supply motor position decreases during the retraction), a negative error means that the supply reel motor 30 is not keeping up with the reference and needs more voltage to prevent tape from falling off trolley 40. FIG. 8D shows the corresponding voltage applied to the supply reel motor 30 in order to keep the proper amount of tension on the tape during the retraction operation. For this particular example, the error voltage was allowed only to add a correction such as to increase the torque to motor 30, thus the applied voltage to the motor is relatively unchanged. Other control systems allow for correction with either increasing or decreasing the voltage to the motor.

As a function of time, FIG. 9A, FIG. 9B, FIG. 9C and FIG. 9D show values of signals on lines 110 (trolley position signal), 114 (supply reel motor reference position signal), 132 (position error signal), and 146 (supply reel motor voltage signal) for the case of a high drag tape drive. A tape unload situation where high drag is present on the supply reel can be caused by mechanical wear, debris, low voltage supply, less than nominal motor parameters, or environmental conditions such as extreme hot or cold temperature. The supply position error signal starts to become negative during the first part of the unload operation. This means that the high drag was causing supply reel motor 30 to not keep up with the reference position with only the fixed backdrive voltage applied to motor 30. The voltage to the supply reel motor 30 adaptively increases to compensate for the high drag situation. This eliminates the chance of tape separating from or falling off trolleys 40 and eventually the need for the extra voltage is eliminated toward the end of the retraction operation.

FIG. 10 shows a system for monitoring performance of the tape drive including trolley motor 50, its trolley load motor control circuit 102, and its tachometer 104, all as described above, with an input of circuit 102 receiving an output signal from trolley tachometer 104. Trolley motor 50 is connected between trolley load motor control circuit 102 and electrical ground. In series with trolley motor 50 between ground and circuit 102 is a sensor 200 which, in the illustrated embodiment, comprises a current sensing resistor 202 and filter/amplifier 204. Filter/amplifier 204 is connected to detect the amount of electrical current flowing through resistor 202. An output of filter/amplifier 204 is applied to analog to digital converter (ADC) 210. The digitally converted (filter and amplified) value is applied to a suitable port of processor 100. Processor 100 also has access to a threshold value from a memory, such as register 220. Processor 100 has coded instructions e.g., for performing a function 225 of calculating the integral of the motor current waveform.

During an extraction/retraction operation, the amount of current flowing through trolley motor 50 is calculated by measuring the voltage across sensing resistor 202 (sensing resistor 202 having a known value). This voltage is filtered and amplified by filter/amplifier 204 and then converted by ADC 210 to a digital value at evenly spaced time intervals throughout the extraction/retraction operation (e.g., every millisecond). These digital values are then read by processor 100 and used by function 225 to calculate the integral of the motor current waveform. At the end of the extraction/retraction operation, the resultant integral value (of the motor current waveform) represents the amount of effort needed to extract/retract the tape. The resultant integral value upon completion of the extraction/retraction operation can then be used, by comparison with the threshold value stored in register 220, to detect changes in tape drive 20 over time. For example, as tape drive 20 wears, the value of the current integral increases. The changes in tape drive 20 over time can be due to numerous factors, such as wear in bearing or gears, break-down of lubricants, debris, etc.

Once the resultant integral exceeds the threshold stored in register 220, a warning flag (or warning signal such as shown on line 230) is set to indicate that tape drive 20 requires service or maintenance. Thereby, the system of FIG. 10 provides predictive maintenance which, when properly heeded, increases the mean time between failures and life of tape drive 20.

Figure 11A:
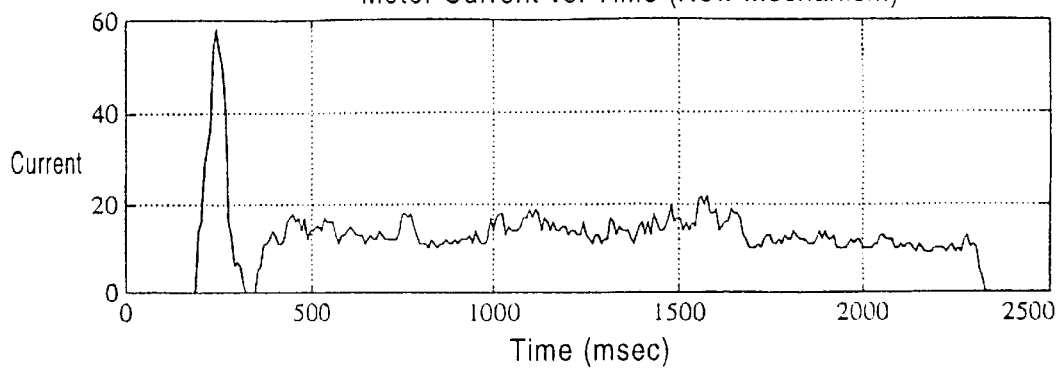
FIG. 11A is a graph of motor current over time during a tape extraction operation for a relatively new tape drive.
Figure 11B:
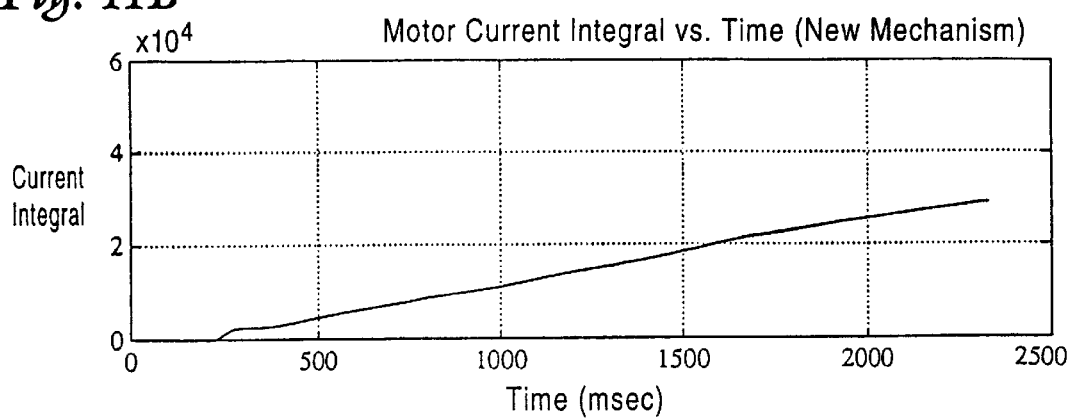
FIG. 11B is a graph of motor current integral during a tape extraction operation for the relatively new tape drive.
Figure 11C:
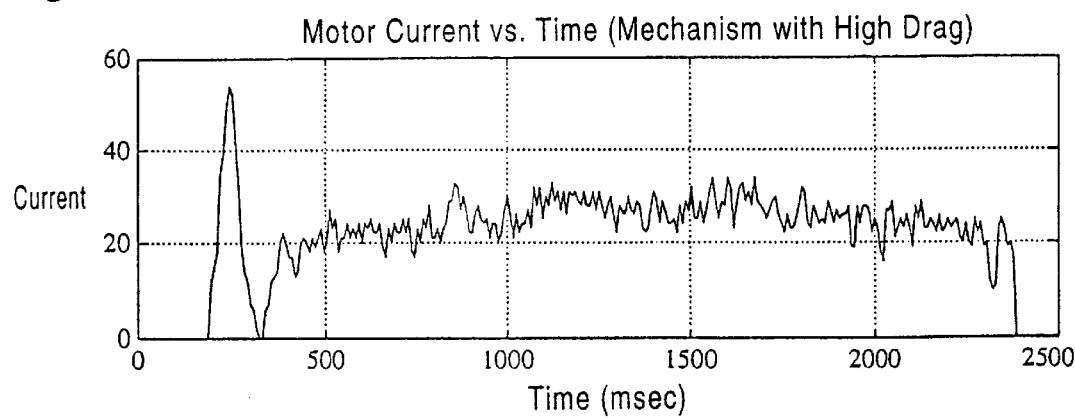
FIG. 11C is a graph of motor current over time during a tape extraction operation for a relatively old tape drive.
Figure 11D:
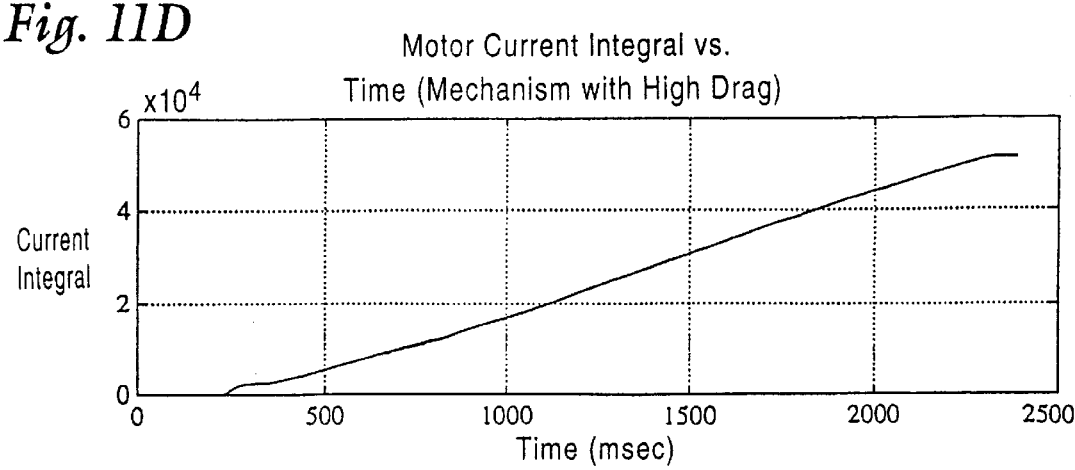
FIG. 11D is a graph of motor current integral during a tape extraction operation for the relatively old tape drive.

FIG. 11A is a graph showing motor current over time during a tape extraction operation for a relatively new tape drive 20. FIG. 11B is a graph showing motor current integral during a tape extraction operation for the relatively new tape drive 20. FIG. 11C is a graph showing motor current over time during a tape extraction operation for a relatively old tape drive 20. FIG. 11D is a graph showing motor current integral during a tape extraction operation for the relatively old tape drive 20.

The final value of the motor current integral waveform for the older tape drives (see FIG. 11D) are substantially greater than for the newer tape drive (see FIG. 11B), indicating greater wear and drag on the older tape drive. With respect to the tape extraction graphs, the level shift is clearly detected by the current invention in view of its calculation of the integral of the motor current. The final value of the motor current integral for the older tape drive is almost twice has large as that for the newer tape drive.

FIG. 10 also shows trolley tachometer 104 connected to processor 100. In addition to the other functions herein described, processor 100 has a set of coded instructions which form trolley velocity control function 300. Function 300 is used to control the speed of trolleys 40 during tape extraction and retraction operations. Processor 100, particularly function 300, generates a position and velocity reference profile for trolleys 40 based on desired acceleration, maximum velocity, and total distance of trolley motion. These velocity and position referey of the shaft of trolley motor 50. An error signal is created by subtracting the measured position and velocity from the reference position and velocity. This error signal is applied to trolley load motor control circuit 102, which in turn outputs a PWM signal which adjusts the amount of voltage being supplied to trolley motor 50.

The velocity control function 30 described above allows flexibility for varying any of the profile parameters (acceleration, maximum velocity, total distance of motion). Function 30 also allows use of multiple profiles. For example, trolley speed can be fast when the tape is not in contact with scanner 90 and then can be slowed to prevent damage to the tape or scanner 90 when in the area in which the tape contacts the scanner 90.

Velocity control function 30 thus provides precise trolley motions in order to overcome the problems which can be caused when tape drive 20 wears and the drag on trolley motor 50 is increased. Such accurate motion control protects the tape from damage and achieves a smooth motion which extends the life of tape drive 20.

It should be understood that the present invention is not confined to tape drives which utilize cartridges. Rather, the invention is applicable to any tape drive in which tape extends between a supply reel and a take-up reel, regardless of whether the reels are housed in a cartridge.

The present invention keeps the winding torque of a supply reel as small as possible in order to protect the tape from being damaged. The invention adapts the torque to compensate for variations between tape drive units (e.g., tape decks). The optimal amount of torque varies from tape drive to tape drive due to differences in motor drag, motor voltage, inertia (related to the radius of the tape pack on the supply reel hub), torque constant, and other factors. The optimal torque for a given tape drive will also change over time and as the mechanism wears out, as debris builds up, or as environmental conditions change.

The present invention eliminates the chance of applying too much tension which could stretch the tape or cause edge damage. It also prevents the case where not enough tension could cause the tape to become slack during the unload and separate from or fall off the trolleys, thus leave it susceptible to being damaged.

The present invention advantageously allows the tape drive to gently handle any thickness and length of media.

The present invention compensates for variations in motor drag or mechanism friction, variations in power supply voltage, and parametric differences between motors (namely torque constant and resistance). Such are accomplished by applying optimal torque to the supply reel based on radius and trolley position during the unload operation. This eliminates the chance of damaging tape by ensuring that proper tape tension is maintained.

While the invention has been particularly shown and described with reference to the preferred embodiments thereof, it will be understood by those skilled in the art that various alterations in form and detail may be made therein without departing from the spirit and scope of the invention. For example, the functions depicted by the enumerated elements in FIG. 5 can be performed either by circuits or a processor executing coded instructions, and one or more of the functions may be grouped together if desired. Moreover, other than using a PID controller, other forms of compensation controllers can be used in other embodiments.

The embodiments of the invention in which an exclusive property or privilege is claimed are defined as follows:

1. A magnetic tape drive which transduces information with respect to magnetic tape, the magnetic tape extending between a tape supply reel and a tape take-up reel, the drive comprising:

a trolley in contact with the tape;

a trolley motor for moving the trolley, whereby the trolley moves the tape between a tape retracted position and a tape extracted position;

a sensor for sensing the electrical current through the trolley motor and generates a signal indicative thereof;

a processor which utilizes the signal generated by the sensor for generating a predictive maintenance warning indication.

2. The apparatus of claim 1, wherein the processor utilizes the signal generated by the sensor for generating an integral of the motor current, and wherein the processor generates the predictive maintenance warning indication when the integral of the motor current exceeds a predetermined threshold value.

3. A method of operating a magnetic tape drive which transduces information with respect to magnetic tape, the magnetic tape extending between a tape supply reel and a tape take-up reel, the method comprising:

activating a trolley motor whereby a trolley moves the tape between a tape retracted position and a tape extracted position;

sensing electrical current through the trolley motor with a trolley motor sensor;

using the sensed electrical current through the trolley to generate a predictive maintenance warning indication.

4. The method of claim 3, further comprising:

using a signal generated by the trolley motor sensor to generate an integral of the motor current;

generating the predictive maintenance warning indication when the integral of the motor current exceeds a predetermined threshold value.

* * * * *